(12) United States Patent
Strijker

(10) Patent No.: US 10,050,539 B2
(45) Date of Patent: Aug. 14, 2018

(54) SWITCHED MODE POWER SUPPLY WITH REDUCED DELAY TIME

(71) Applicant: NXP B.V., Eindhoven (NL)

(72) Inventor: Joan Wichard Strijker, Wijchen (NL)

(73) Assignee: NXP B.V., Eindhoven (NL)

( * ) Notice: Subject to any disclaimer, the term of this patent is extended or adjusted under 35 U.S.C. 154(b) by 0 days.

(21) Appl. No.: 15/390,617

(22) Filed: Dec. 26, 2016

(65) Prior Publication Data

US 2018/0183342 A1    Jun. 28, 2018

(51) Int. Cl.
*H02M 3/33* (2006.01)
*H02M 3/335* (2006.01)

(52) U.S. Cl.
CPC .............. *H02M 3/33515* (2013.01)

(58) Field of Classification Search
CPC .. H02M 3/3315; H02M 1/08; H02M 3/33592; H02M 2001/0006; Y02B 70/1475
USPC ....... 363/16, 17, 21.06, 21.08, 21.12, 21.14, 363/21.15, 89, 127
See application file for complete search history.

(56) References Cited

U.S. PATENT DOCUMENTS

| | | | |
|---|---|---|---|
| 6,198,638 B1 | 3/2001 | Lee | |
| 6,563,718 B1 | 5/2003 | Li et al. | |
| 6,961,253 B1 | 11/2005 | Cohen | |
| 7,764,516 B2* | 7/2010 | Yang | H02M 3/33507 363/127 |
| 7,787,264 B2* | 8/2010 | Yang | H02M 3/33592 363/21.06 |
| 7,907,426 B2* | 3/2011 | Lin | H02M 3/33592 363/21.12 |
| 8,873,254 B2* | 10/2014 | Morris | H02M 3/335 363/21.14 |
| 9,755,529 B2* | 9/2017 | Chen | H02M 3/33515 |
| 2005/0248964 A1 | 11/2005 | Dalal | |
| 2006/0013022 A1 | 1/2006 | Jitaru | |
| 2015/0249398 A1 | 9/2015 | Halberstadt | |
| 2015/0263542 A1* | 9/2015 | Sato | H02J 7/007 363/21.12 |
| 2016/0329819 A1* | 11/2016 | Chen | H02M 3/33515 |

OTHER PUBLICATIONS

TEA1791AT, GreenChip Synchronous Rectifier Controller; Rev.01, http://www.nxp.com/documents/data_sheet/TEA1791AT.pdf; Jun. 7, 2010.
PSMN4R6-60PS, N-channel 60 V, 4.6m standard level MOSFET in TO220; Rev. 3, http://cache.nxp.com/documents/data_sheet/PSMN4R6-60PS.pdf; Apr. 18, 2012.

* cited by examiner

*Primary Examiner* — Rajnikant Patel

(57) ABSTRACT

Switched mode power supply (SMPS) with a control circuitry and method of operating such a SMPS are described. The control circuitry includes a first driver to drive an input switch in response to a driving signal, a pulse circuit to generate a pulse signal in response to the driving signal, a timer circuit to generate a delayed signal in response to the pulse signal and a second driver to drive to the output switch in response to the delayed signal.

20 Claims, 6 Drawing Sheets

SWITCHED MODE POWER SUPPLY WITH REDUCED DELAY TIME

Embodiments of the invention relate generally to switched mode power supplies, and, more particularly, to a switched mode power supply with a synchronous rectifier.

Switched mode power supplies are widely used to convert power from a source, such as mains power, to direct current (DC) power supply for electronic devices, such as cellphones and tablets. Switched mode power supplies use a transformer as the storage inductor, which provides isolation between input and output sides of the switched mode power supplies as well as the ability to adjust the output voltage. Transfer of energy from the input side to the output side of a switched mode power supply is controlled by an input switch in the input side and an output switch in the output side. The switch-on timing of the output switch affects the efficiency for switched mode power supplies with synchronous rectification (SR). As switching frequency of the output switch increases, switch-on delay time of the output switch may seriously reduce the efficiency.

SUMMARY

Switched mode power supply (SMPS) with a control circuitry and method of operating such a SMPS are described. The control circuitry includes a first driver to drive an input switch in response to a driving signal, a pulse circuit to generate a pulse signal in response to the driving signal, a timer circuit to generate a delayed signal in response to the pulse signal and a second driver to drive to the output switch in response to the delayed signal.

In an embodiment, a SMPS includes a transformer with a first winding and a second winding, the first winding being connected to an input node, the second winding being connected to an output node, an input switch connected to the first winding of the transformer, an output switch connected to the second winding of the transformer, and a control circuitry to drive the input and output switches. The control circuitry includes a first driver to drive the input switch in response to a driving signal, a pulse circuit to generate a pulse signal in response to the driving signal, a timer circuit to generate a delayed signal in response to the pulse signal, and a second driver to drive to the output switch in response to the delayed signal.

In an embodiment, the control circuitry further includes a signal coupling device for transmission of the pulse signal from an input side of the SMPS to an output side of the SMPS.

In an embodiment, the signal coupling device is a transformer or a capacitor.

In an embodiment, the control circuitry further includes a flipflop connected to receive the delayed signal from the timer circuit to provide an input signal to the second driver to drive to the output switch.

In an embodiment, the control circuitry further includes a comparator that compares a signal at a node between the second winding of the transformer and the output switch with a reference voltage signal to output a comparison signal to the timer circuit, the comparison signal being used by the timer circuit to adjust a delay of the timer circuit.

In an embodiment, the timer circuit is configured to detect the width of the comparison signal to determine the delay of the timer circuit.

In an embodiment, the timer circuit includes a gated counter to generate a value indicative of the width of the comparison circuit and a second comparator that generates a reduce signal in response to a comparison of the value from the gated counter to a target value to reduce the delay of the timer circuit.

In an embodiment, the timer circuit further includes a register to store a delay value that is reduced when the reduce signal indicates that the value from the gated counter is greater than the target value, the delay value stored in the register being used to set the delay of the timer circuit based on a number of clocks, where the number is equal to the delay value.

In an embodiment, a method of operating a SMPS includes sending a first driving signal to a first driver to turn on a first switch connected to a first winding of a transformer that is connected to an input node of the SMPS to store energy in the transformer, sending the first driving signal to a pulse circuit to generate a pulse signal in response to the driving signal, sending the pulse signal to a timer circuit to generate a delayed signal in response to the pulse signal, and sending a second driving signal to a second driver to turn on an output switch in response to the delayed signal, the second switch being connected to a second winding of the transformer that is connected to an output node to transfer the stored energy to an output node of the SMPS.

In an embodiment, sending the pulse signal to the timer circuit includes transmitting the pulse signal through a signal coupling device from an input side of the SMPS to an output side of the SMPS.

In an embodiment, the signal coupling device is a transformer or a capacitor.

In an embodiment, the method further comprises sending the delayed signal to a flipflop to produce the input signal to the second driver.

In an embodiment, the method further comprises comparing a signal at a node between the second winding of the transformer and the output switch with a reference voltage signal to output a comparison signal to the timer circuit, the comparison signal being used by the timer circuit to adjust a delay of the timer circuit.

In an embodiment, the method further comprises detecting the width of the comparison signal to determine the delay of the timer circuit.

In an embodiment, the method further comprises generating a value indicative of the width of the comparison circuit and comparing the value to a target value to generate a reduce signal to reduce the delay of the timer circuit.

In an embodiment, the method further comprises reducing a delay value stored in a register when the reduce signal indicates that the pulse width value is greater than the target value, the delay value stored in the register being used to set the delay of the timer circuit based on a number of clocks, where the number is equal to the delay value.

In an embodiment, a SMPS includes a transformer with a primary winding and a secondary winding, an input capacitor connected to an input power source and the primary winding of the transformer, an input switch connected to the primary winding of the transformer, an output capacitor connected to the secondary winding of the transformer, an output switch connected to the secondary winding of the transformer, a first control circuit to control the input switch, the first control circuit including a first driver to drive the input switch in response to a driving signal and a pulse circuit to generate a pulse signal in response to the driving signal, and a second control circuit to control the output switch, the second control circuit including a timer circuit to generate a delayed signal in response to the pulse signal and a second driver to drive to the output switch in response to the delayed signal.

In an embodiment, the SMPS further comprises a signal coupling device for transmission of the pulse signal from an input side of the SMPS to an output side of the SMPS.

In an embodiment, the second control circuit further includes a comparator that compares a signal at a node between the second winding of the transformer and the output switch with a reference voltage signal to output a comparison signal to the timer circuit, the comparison signal being used by the timer circuit to adjust a delay of the timer circuit.

In an embodiment, the timer circuit is configured to detect the width of the comparison signal to determine the delay of the timer circuit.

Other aspects and advantages of embodiments of the present invention will become apparent from the following detailed description, taken in conjunction with the accompanying drawings, depicted by way of example of the principles of the invention.

BRIEF DESCRIPTION OF THE DRAWINGS

Throughout the description, similar reference numbers may be used to identify similar elements.

DETAILED DESCRIPTION

Figure 1:
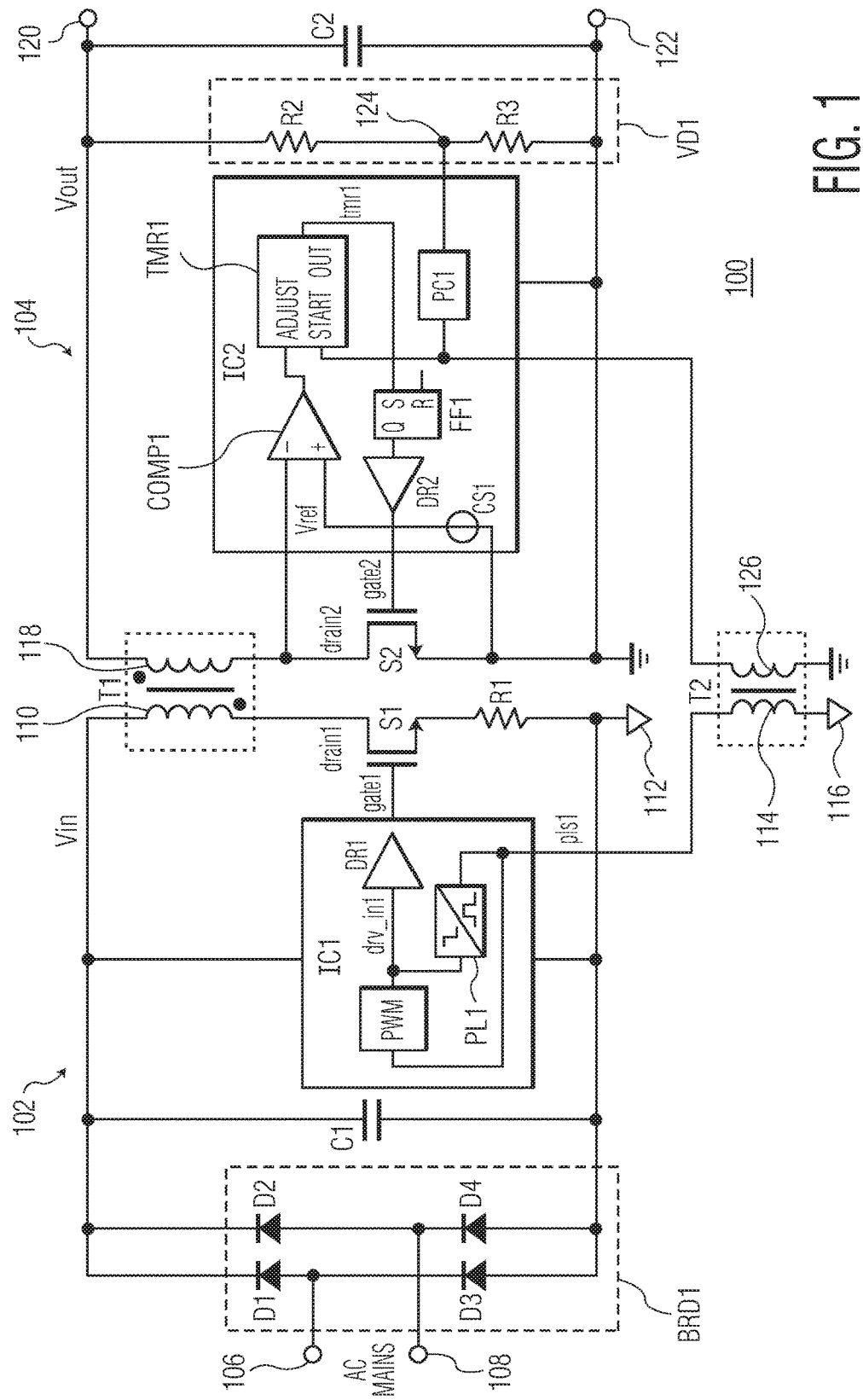
FIG. 1 is a circuit diagram of a SMPS in accordance with an embodiment of the invention.

It will be readily understood that the components of the embodiments as generally described herein and illustrated in the appended figures could be arranged and designed in a wide variety of different configurations. Thus, the following detailed description of various embodiments, as represented in the figures, is not intended to limit the scope of the present disclosure, but is merely representative of various embodiments. While the various aspects of the embodiments are presented in drawings, the drawings are not necessarily drawn to scale unless specifically indicated.

The described embodiments are to be considered in all respects only as illustrative and not restrictive. The scope of the invention is, therefore, indicated by the appended claims rather than by this detailed description. All changes which come within the meaning and range of equivalency of the claims are to be embraced within their scope.

Reference throughout this specification to features, advantages, or similar language does not imply that all of the features and advantages that may be realized with the present invention should be or are in any single embodiment. Rather, language referring to the features and advantages is understood to mean that a specific feature, advantage, or characteristic described in connection with an embodiment is included in at least one embodiment. Thus, discussions of the features and advantages, and similar language, throughout this specification may, but do not necessarily, refer to the same embodiment.

Furthermore, the described features, advantages, and characteristics of the invention may be combined in any suitable manner in one or more embodiments. One skilled in the relevant art will recognize, in light of the description herein, that the invention can be practiced without one or more of the specific features or advantages of a particular embodiment. In other instances, additional features and advantages may be recognized in certain embodiments that may not be present in all embodiments of the invention.

Reference throughout this specification to "one embodiment," "an embodiment," or similar language means that a particular feature, structure, or characteristic described in connection with the indicated embodiment is included in at least one embodiment. Thus, the phrases "in one embodiment," "in an embodiment," and similar language throughout this specification may, but do not necessarily, all refer to the same embodiment.

An aspect of a switched mode power supply (SMPS) with synchronous rectification (SR) is the turn-on timing of an SR switch. In a conventional SMPS of interest, a negative drain-source signal of the SR metal-oxide-semiconductor field-effect transistor (MOSFET) switch is measured with a comparator. The comparator is used to compare the negative drain-source signal with a negative reference voltage. As soon as the negative drain-source signal drops below the reference voltage, the signal from the comparator sets a flipflop to activate a gate driver to drive the SR MOSFET. Because of the delay in the comparator and the driver, the SR MOSFET switch is always switched on with a certain delay. During the delay, the SR MOSFET is not turned on and the current is flowing through the body diode of the SR MOSFET. The forward voltage drop of the body diode of the SR MOSFET is typically quite large compared to the voltage drop across the SR MOSFET when it is driven in conduction with the same current. For example, in a 5V 5 A power supply, the current through the SR MOSFET at switch-on can be as high as 20 A. For a 4.6 milliOhm (mOhm) SR MOSFET, the forward voltage drop of the body diode is about 800 millivolts (mV). If the total delay time is 100 nanoseconds (nsec) and the SMPS is switching at 100 kilohertz (kHz), the dissipation during this time is 100 nsec*100 kHz*0.8 V*20 A=160 mW. If the SR MOSFET would have been conductive in this region, the dissipation during this time would be 100 nsec*100 kHz*4.6 mohm*20 A^2=18 mW. So the total efficiency of the SMPS is (160 mW−18 mW)/(5V*5 A)=0.62% lower due to the body diode conduction time. For high power density SMPS, the switching frequency will be much higher. For example, if a 500 kHz switching frequency is used to make the total application smaller, the efficiency will drop more than 3% due to the delay. Thus, especially for high frequency switching, it is essential to keep the body diode conduction time as low as possible.

FIG. 1 is a circuit diagram of a SMPS 100 with synchronous rectification (SR) in accordance with an embodiment of the invention. The SMPS 100 may be used for various power supply applications, such as a power supply for small electronic devices, e.g., cell phones, tablets and laptops. As described in detail below, the SMPS 100 is designed to reduce the body diode conduction time of an output switch to increase the energy efficiency of the SMPS.

As shown in FIG. 1, the SMPS 100 includes a primary or input side 102 and a secondary or output side 104 that are isolated from each other via a transformer T1 and a signal transformer T2. As explained below, the transformer T1 is used to transfer energy from the input side 102 to the output side 104, while the signal transformer T2 is used to transmit signals between the input side and the output side.

The input side 102 of the SMPS 100 includes a bridge rectifier diode BRD1, an input capacitor C1, a first control circuit IC1, a first switch S1 and a resistor RE The bridge rectifier diode BRD1 is made up of four diodes D1, D2, D3 and D4, which are connected to alternating-current (AC) mains via a pair of input nodes 106 and 108. The bridge rectifier diode BRD1 is connected to the input capacitor C1. Thus, the AC mains is connected to the input capacitor C1 via the bridge rectifier diode BRD1.

The first control circuit IC1 is configured to drive the first switch S1, which can be a transistor with a control terminal (e.g., gate) and conduction terminals (e.g., source and drain) such as a metal-oxide-semiconductor field-effect transistor (MOSFET), as shown in FIG. 1. The MOSFET S1 is connected to the primary winding 110 of the transformer T1 and connected to a common node 112, which may be ground, via the resistor R1.

As shown in FIG. 1, the first control circuit IC1 includes a pulse width modulator PWM, a driver circuit DR1 and a pulse circuit PL1. The pulse width modulator PWM provides a driving signal drv_in1 in response to a control signal received from the output side 104 via the signal transformer T2. As such, the pulse width modulator PWM includes an input that is connected to a primary winding 114 of the signal transformer T2, which is connected to a common node 116, which may be ground. The pulse width modulator PWM is a well-known circuit, and thus, is not described herein in detail. The driver circuit DR1 includes an input that receives the driving signal drv_in1 from the pulse width modulator PWM and generates a gate signal gate1, which is used to drive the first switch S1. In an embodiment, the first switch S1 can be a transistor with a control terminal (e.g., gate) and conduction terminals (e.g., source and drain) such as a MOSFET, as shown in FIG. 1. The driver circuit DR1 is designed to generate the gate signal gate1 in response to the driving signal drv_in1 to selectively turn on or turn off the MOSFET S1. The driver circuit DR1 can be any known transistor driver, such as a MOSFET driver circuit commonly found in a conventional SMPS with MOSFET switches.

The pulse circuit PL1 of the first control circuit IC1 includes an input, which is connected to the input of the driver circuit DR1 to receive the driving signal drv_in1. The pulse circuit PL1 is configured to generate a pulse pls1 in response to the driving signal drv_in1, which is transmitted to the output side 104 via the signal transformer T2. As such, the pulse circuit PL1 includes an output that is connected to the primary winding 114 of the signal transformer T2.

The output side 104 of the SMPS 100 includes an output capacitor C2 and a second switch S2, a voltage divider VD1 and a second control circuit IC2. The output capacitor C2 is connected to one side of the secondary winding 118 of the transformer T1 and ground. The second switch S2 is connected to the other side of the secondary winding 118 of the transformer T1 and ground. The output capacitor C2 is also connected to output nodes 120 and 122. The voltage divider VD1 is connected to the output nodes 120 and 122. In the illustrated embodiment, the voltage divider VD1 includes two resistors R2 and R3 connected in series. The voltage divider VD1 provides a voltage at a node 124 that indicates the output voltage Vout across the output nodes 120 and 122, which is used by the second control circuit IC2 as explained below.

The second control circuit IC2 includes a timer circuit TMR1, a flipflop FF1, a driver circuit DR2, a comparator COMP1, a current source CS1 and a power control circuit PC1. The timer circuit TMR1 includes a first input that is connected to a secondary winding 126 of the signal transformer T2 to receive the pulse signal pls1 from the pulse circuit PL1 via the signal transformer T2. The pulse signal pls1 on the first input of the timer circuit TMR1 is used to start a timer in the timer circuit. The timer circuit TMR1 includes an output that transmits an output timer signal tmr1 after a regulated delay time from the receiving the pulse signal pls1. The timer circuit TMR1 further includes a second input to receive a comparison signal cmp1 from the comparator COMP1, which is used by the timer circuit TMR1 to adjust the time delay.

The flipflop FF1 is connected to the timer circuit TMR1 to receive the timer signal tmr1, which sets the flipflop to output a drive signal to the drive circuit DR2. The driver circuit DR2 generates an output signal gate2 in response to the drive signal from the flipflop FF1. The output signal gate2 from the driver circuit DR1 is applied to the second switch S2 to control the second switch, which can be a transistor with a control terminal (e.g., gate) and conduction terminals (e.g., source and drain). In the illustrated embodiment, the second switch S2 is a synchronous rectifier (SR) MOSFET.

The comparator COMP1 includes a first input connected to the drain of the SR MOSFET S2 and a second input connected to the current source CS1, which generates a reference voltage Vref. The comparator COMP1 includes an output, which is connected to an adjust input of the timer TMR1. The comparator COMP2 generates the comparison signal cmp1, which has a width that is dependent on the delay time of the timer circuit TMR1. Thus, the width of the signal cmp1 can be regulated to a certain minimum by adjusting the delay of the timer circuit TMR1. If the pulse width of the signal cmp1 is too large, the SR MOSFET S2 was turned on too late so the timer delay is reduced for the next switching cycle. If the pulse width of the signal cmp1 is too small (or zero), the SR MOSFET S2 was turned on too soon so the timer delay is increased for the next switching cycle. The delay of circuits in the signal path is partly constant for a certain application (e.g., due to processing of the IC circuits and threshold voltage of S2) or only change slowly due to, e.g., temperature variations. So once the turn-on timing of the SR MOSFET S2 is regulated to the correct delay time after the SMPS 100 has started, the turn-on timing only has to be adjusted for slow variations. The initial delay of the timer circuit TMR1 at start-up of the SMPS 100 should be set long enough to prevent the MOSFET switches S1 and S2 from turning on at the same time, which could happen in case the delay from the drive signal drv_in1 to the gate of the MOSFET switch S1 is relatively long compared to the delay of the driving signal to the gate of the SR MOSFET switch S2.

The power control circuit PC1 includes an input connected to the node 124 on the voltage divider VD1 to measure the output voltage. The power control circuit PC1 includes an output to transmit a control signal for the power width modulator PWM via the signal transformer T2. The transmission of the control signal from the power control circuit PC1 to the power width modulator PWM and the pulse signal pls1 from the pulse circuit PL1 to the timer circuit TMR1 may be timed so that only one of the signals is transmitted via the signal transformer T2.

As described above, the first control circuit IC1 drives the input MOSFET switch S1 and the second control circuit IC2 drives the output MOSFET switch S2 using the pulse signal pls1 transmitted from the first control circuit to the second control circuit via the signal transformer T2. Thus, the first and second control circuits IC1 and IC2 and the signal transformer T2 can be viewed as forming a control circuitry for the MOSFET switches S1 and S2 of the SMPS 100. The control circuitry operates to reduce the body diode conduction time of the output MOSFET switch S2 to increase the energy efficiency of the SMPS 100.

The overall operation of the SMPS 100 in accordance with an embodiment is now briefly described. In the primary stroke, the gate of the MOSFET S1 is set high by the first control circuit IC1, which turns on the MOSFET S1. However, the gate of the SR MOSFET S2 is initially set low by the second control circuit IC2, which turns off the SR MOSFET S2. During the primary stroke, energy is stored in the transformer T1. During the secondary stroke, the gate of the SR MOSFET S2 is set high by the second control circuit IC2, which turns on the SR MOSFET S2. The energy stored in the transformer T1 during the primary stroke is then transferred to the output side 104 during the secondary stroke. The turn-on timing of the SR MOSFET S2 is controlled by the components of the first and second control circuits IC1 and IC2, as explained below.

The driving signal drv_in1 from the pulse width modulator PWM is sent to the driver circuit DR1 to turn on the MOSFET S1. The driving signal drv_in1 is also sent to the pulse circuit PL1, which generates a pulse pls1 in response to the driving signal drv_in1. The pulse signal pls1 is then sent to the output side 104 via the signal transformer T2 to the timer circuit TMR1. The pulse signal pls1 starts the timer in the timer circuit TMR1. When the timer trips after a regulated delay time, the timer circuit TMR1 outputs the timer signal tmr1, which changes the state of the flipflop FF1 to output a driving signal to the driver circuit DR2, which sets the gate of the SR MOSFET S2 high, turning on the SR MOSFET.

Figure 2:
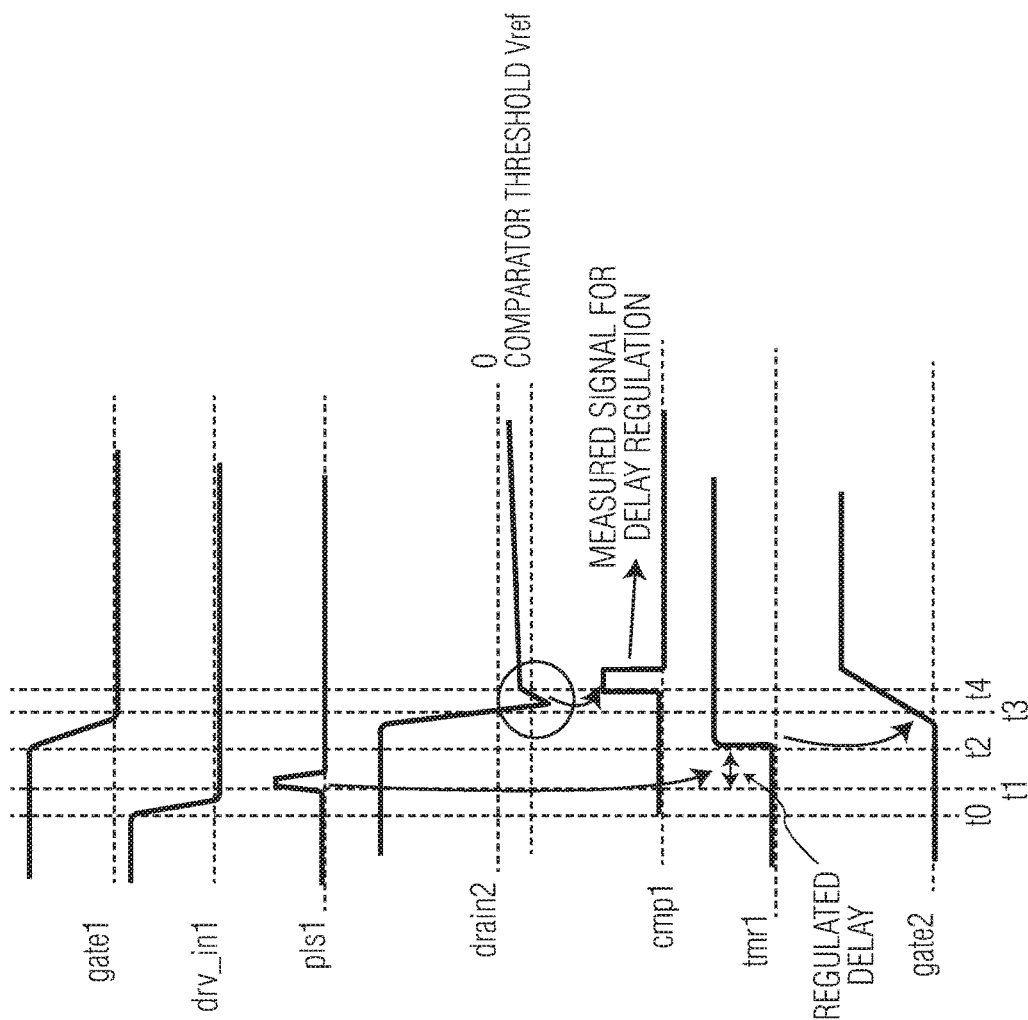
FIG. 2 is a signal diagram of the SMPS depicted in FIG. 1 in accordance with an embodiment of the invention.

A detailed signal diagram for the first and second control circuits IC1 and IC2 of the SMPS 100 in accordance with an embodiment of the invention is shown in FIG. 2. At t=t0, the driving signal drv_in1 drops to zero. At t=t1, the pulse circuit PULSE1 generates a pulse pls1, which is sent to the output side 104 via the signal transformer T2. After the regulated delay, at t=t2, the timer signal tmr1 is generated, which sets the flip-flop FF1. The signal from the flipflop FF1 drives the driver circuit DR2, which turns on the SR MOSFET S2.

Depending on the delay, the output signal cmp1 from the comparator COMP1 will have a certain width, as illustrated in FIG. 2. This output signal cmp1 is fed back into the timer circuit TMR1, which uses the width of the output signal to determine the delay of the timer TIMER1 for the next switching cycle. Once in regulation, the comparator COMP1 outputs a small, but non-zero, pulse cmp1. The body diode conduction time of the SR MOSFET S2 is then regulated to a minimum. Depending on how small the pulse signal cmp1 can be made, which depends on the IC technology, the losses due to body diode conduction can be reduced to almost zero. With an almost zero body diode conduction time, the losses in the SR MOSFET S2 are minimized and the efficiency of the SMPS 100 is optimized.

In an alternative embodiment, instead of using the signal transformer T2 as a signal coupling device, a capacitive coupling can be used (or any other means to transfer signals between the input and output sides of the SMPS). If capacitive coupling is used, the signal transformer T2 is replaced by a capacitor.

Figure 3:
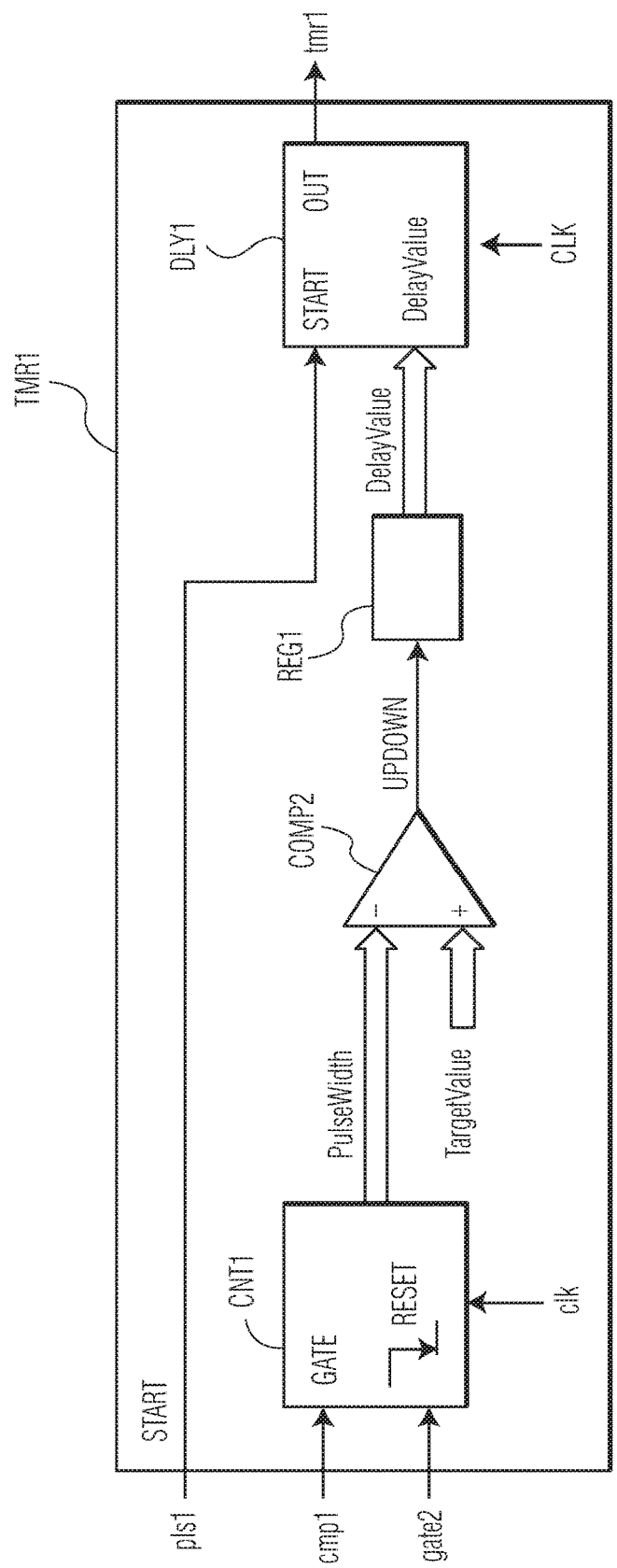
FIG. 3 is a diagram of a timer circuit in accordance with an embodiment of the invention.

Turning now to FIG. 3, a digital implementation of the timer circuit TMR1 in accordance with an embodiment of the invention is shown. In this implementation, the timer circuit TMR1 includes a gated counter CNT1, a digital comparator COMP2, a storage register REG1 and a delay circuit DLY1. The gated counter CNT1 operates to measure the pulse width of the comparison signal cmp1 from the comparator COMP1, and to output a digital value PulseWidth that represents the pulse width. The gated counter CNT1 is reset using the signal gate2 on the gate of the SR MOSFET S2. The digital comparator COMP2 receives the digital value PulseWidth and compares it to a target value TargetValue. Based on the comparison, the digital comparator COMP2 outputs an updown signal. If the pulse width value is larger than the target value, a delay value in the storage register REG1 is decreased. The delay circuit DLY1 operates to delay the start of the timer in the delay circuit with a delay equal to N number of clocks, where N equals the delay value stored in the storage register REG1. For this digital implementation, a high frequency clock signal clk (e.g., 100 MHz) is required.

In an alternative embodiment, for low power consumption, it may be advantageous to use an analog circuit for the timer TMR1. In this embodiment, the gated counter CNT1 and the delay circuit DLY1 are replaced by analog timers, the digital comparator COMP2 is replaced by an analog comparator, and the storage register REG1 is replaced with a capacitor, which stores the delay value as an analog voltage instead of a digital value.

Figure 4:
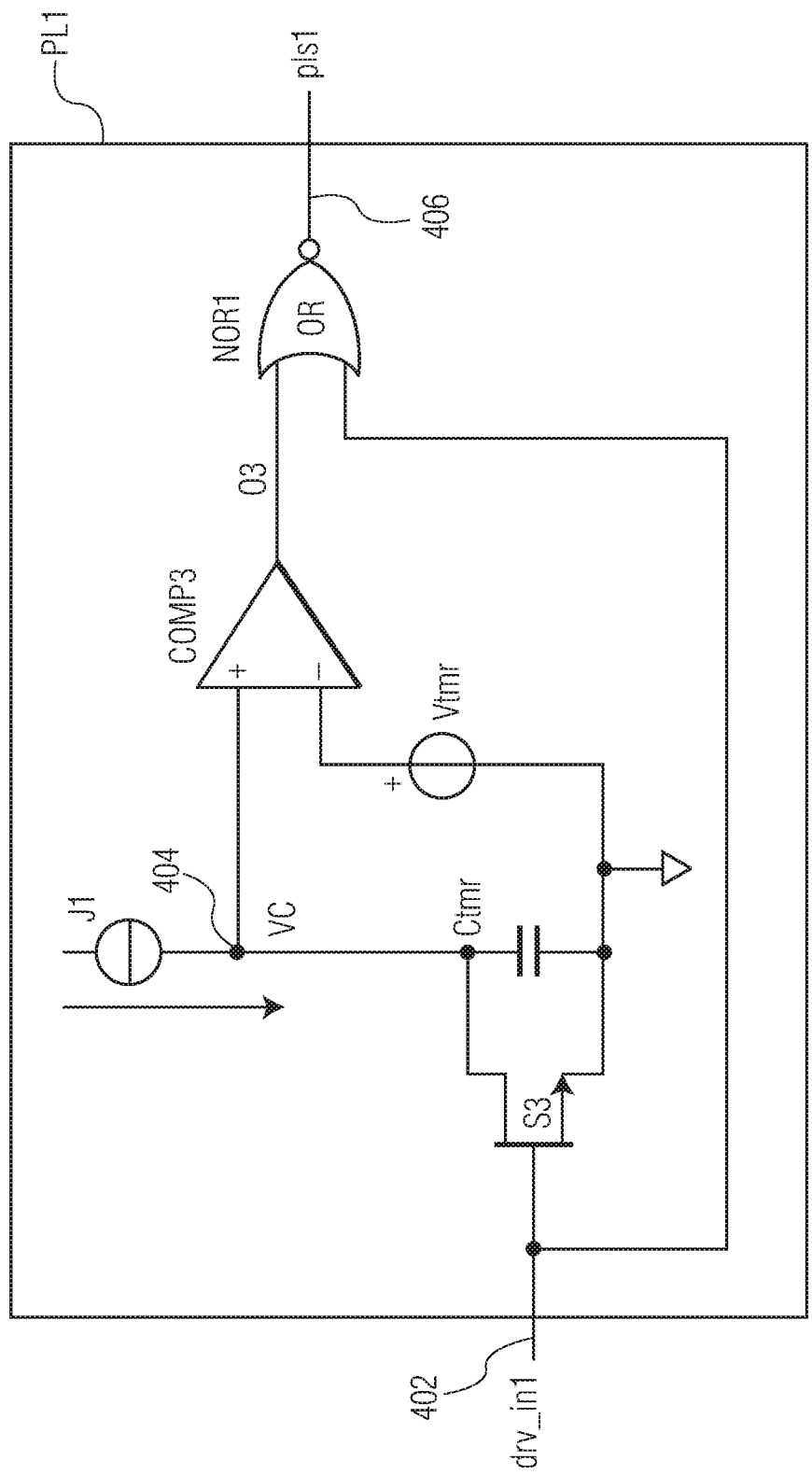
FIG. 4 is a diagram of a pulse circuit in accordance with an embodiment of the invention.

Turning now to FIG. 4, an implementation of the pulse circuit PL1 in accordance with an embodiment of the invention is shown. In this implementation, the pulse circuit PL1 includes a current source J1, a capacitor Ctmr, a switch S3, a comparator COMP3, a voltage source Vtmr and a NOR gate NOR1. The current source J1 is connected to the capacitor Ctmr, which is connected to the switch S3. The switch S3 can be a transistor with a control terminal (e.g., gate) and conduction terminals (e.g., source and drain) such as a metal-oxide-semiconductor field-effect transistor (MOSFET), as shown in FIG. 4. The control node or gate of the MOSFET S3 is connected to an input 402 of the pulse circuit PL1 to receive the driving signal drv_in1. The comparator COMP3 includes a first input that is connected to a node 404 between the current source J1 and the capacitor Ctmr, and a second input that is connected to a voltage source Vtmr. The comparator COMP3 includes an output that generates a comparison signal O3. The NOR gate NOR1 includes a first input connected to the output of the comparator COMP3 to receive the comparison signal O3, and a second input connected to the input 402 of the pulse circuit PL1 to receive the driving signal drv_in1. The NOR gate NOR1 includes an output 406 to output the pulse signal pls1.

Figure 5:
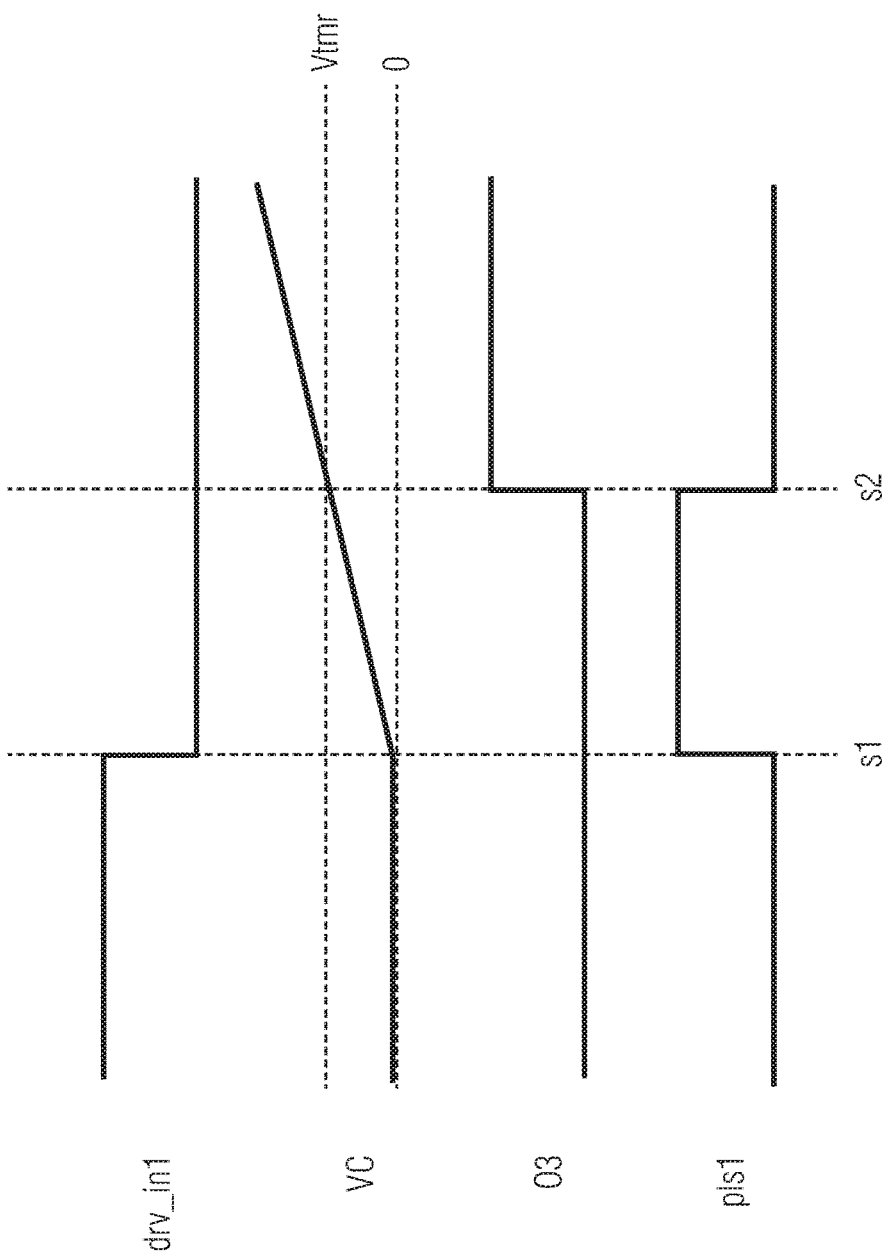
FIG. 5 is a signal diagram of the pulse circuit depicted in FIG. 4 in accordance with an embodiment of the invention

The operation of the pulse circuit PL1 is described with reference to a signal diagram shown in FIG. 5. Initially, the driving signal drv_in1 is high, which means that the MOSFET S3 is in conduction mode. Thus, charge on the capacitor Ctmr is discharged through the MOSFET S3 and the output signal O3 of the comparator COMP3 is low. Consequently, the output signal pls1 from the NOR gate NOR1 is also low. When the input driving signal drv_in1 switches from a high level to a low level at t=s1, the MOSFET S3 is turned off and the output signal pls1 switches to high. The current source J1 then charges the capacitor Ctmr. As soon as the voltage VC on the capacitor Ctmr reaches the voltage of the voltage source Vtmr at t=s2, the comparator COMP3 trips and outputs a high level. As a result, the output signal pls1 switches back to low again.

Figure 6:
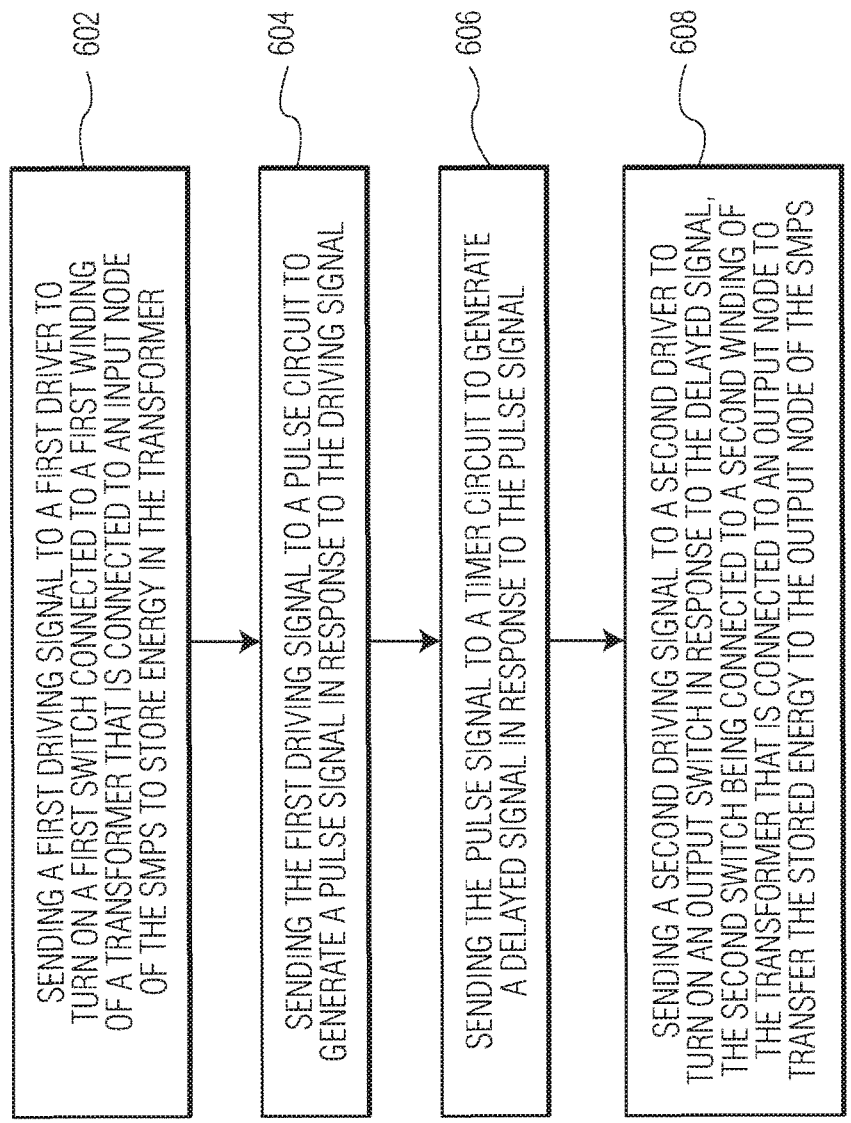
FIG. 6 is a process flow diagram of a method of operating a SMPS in accordance with an embodiment of the invention.

FIG. 6 is a process flow diagram of a method of operating an SMPS in accordance with an embodiment of the invention. At block 602, a first driving signal is sent to a first driver to turn on a first switch connected to a first winding of a transformer that is connected to an input node of the SMPS to store energy in the transformer. At block 604, the first driving signal is sent to a pulse circuit to generate a pulse signal in response to the driving signal. At block 606, the pulse signal is sent to a timer circuit to generate a delayed signal in response to the pulse signal. At block 608, a second driving signal is sent to a second driver to turn on an output switch in response to the delayed signal. The second switch is connected to a second winding of the transformer that is connected to an output node to transfer the stored energy to an output node of the SMPS.

Although the operations of the method herein are shown and described in a particular order, the order of the operations of the method may be altered so that certain operations may be performed in an inverse order or so that certain operations may be performed, at least in part, concurrently with other operations. In another embodiment, instructions or sub-operations of distinct operations may be implemented in an intermittent and/or alternating manner.

In addition, although specific embodiments of the invention that have been described or depicted include several components described or depicted herein, other embodiments of the invention may include fewer or more components to implement less or more feature.

Furthermore, although specific embodiments of the invention have been described and depicted, the invention is not to be limited to the specific forms or arrangements of parts so described and depicted. The scope of the invention is to be defined by the claims appended hereto and their equivalents.

What is claimed is:

1. A switched mode power supply (SMPS) comprising:
   a transformer with a first winding and a second winding, the first winding being connected to an input node, the second winding being connected to an output node;
   an input switch connected to the first winding of the transformer;
   an output switch connected to the second winding of the transformer; and
   a control circuitry to drive the input and output switches, the control circuitry including:
     a first driver to drive the input switch in response to a driving signal;
     a pulse circuit to generate a pulse signal in response to the driving signal;
     a timer circuit to generate a delayed signal in response to the pulse signal; and
     a second driver to drive to the output switch in response to the delayed signal.

2. The SMPS of claim 1, wherein the control circuitry further includes a signal coupling device for transmission of the pulse signal from an input side of the SMPS to an output side of the SMPS.

3. The SMPS of claim 1, wherein the signal coupling device is a transformer or a capacitor.

4. The SMPS of claim 1, wherein the control circuitry further includes a flipflop connected to receive the delayed signal from the timer circuit to provide an input signal to the second driver to drive to the output switch.

5. The SMPS of claim 1, wherein the control circuitry further includes a comparator that compares a signal at a node between the second winding of the transformer and the output switch with a reference voltage signal to output a comparison signal to the timer circuit, the comparison signal being used by the timer circuit to adjust a delay of the timer circuit.

6. The SMPS of claim 5, wherein the timer circuit is configured to detect the width of the comparison signal to determine the delay of the timer circuit.

7. The SMPS of claim 6, wherein the timer circuit includes a gated counter to generate a value indicative of the width of the comparison circuit and a second comparator that generates a reduce signal in response to a comparison of the value from the gated counter to a target value to reduce the delay of the timer circuit.

8. The SMPS of claim 7, wherein the timer circuit further includes a register to store a delay value that is reduced when the reduce signal indicates that the value from the gated counter is greater than the target value, the delay value stored in the register being used to set the delay of the timer circuit based on a number of clocks, where the number is equal to the delay value.

9. A method of operating a switched mode power supply (SMPS), the method comprising:
   sending a first driving signal to a first driver to turn on a first switch connected to a first winding of a transformer that is connected to an input node of the SMPS to store energy in the transformer;
   sending the first driving signal to a pulse circuit to generate a pulse signal in response to the driving signal;
   sending the pulse signal to a timer circuit to generate a delayed signal in response to the pulse signal; and
   sending a second driving signal to a second driver to turn on an output switch in response to the delayed signal, the second switch being connected to a second winding of the transformer that is connected to an output node to transfer the stored energy to an output node of the SMPS.

10. The method of claim 9, wherein sending the pulse signal to the timer circuit includes transmitting the pulse signal through a signal coupling device from an input side of the SMPS to an output side of the SMPS.

11. The method of claim 10, wherein the signal coupling device is a transformer or a capacitor.

12. The method of claim 9, further comprising sending the delayed signal to a flipflop to produce the input signal to the second driver.

13. The method of claim 9, further comprising comparing a signal at a node between the second winding of the transformer and the output switch with a reference voltage signal to output a comparison signal to the timer circuit, the comparison signal being used by the timer circuit to adjust a delay of the timer circuit.

14. The method of claim 13, further comprising detecting the width of the comparison signal to determine the delay of the timer circuit.

15. The method of claim 14, further comprising generating a value indicative of the width of the comparison circuit and comparing the value to a target value to generate a reduce signal to reduce the delay of the timer circuit.

16. The method of claim 15, further comprising reducing a delay value stored in a register when the reduce signal indicates that the pulse width value is greater than the target value, the delay value stored in the register being used to set the delay of the timer circuit based on a number of clocks, where the number is equal to the delay value.

17. A switched mode power supply (SMPS) comprising:
   a transformer with a primary winding and a secondary winding;
   an input capacitor connected to an input power source and the primary winding of the transformer;
   an input switch connected to the primary winding of the transformer;

an output capacitor connected to the secondary winding of the transformer;

an output switch connected to the secondary winding of the transformer;

a first control circuit to control the input switch, the first control circuit including a first driver to drive the input switch in response to a driving signal and a pulse circuit to generate a pulse signal in response to the driving signal; and a second control circuit to control the output switch, the second control circuit including a timer circuit to generate a delayed signal in response to the pulse signal and a second driver to drive to the output switch in response to the delayed signal.

18. The SMPS of claim 17, further comprising a signal coupling device for transmission of the pulse signal from an input side of the SMPS to an output side of the SMPS.

19. The SMPS of claim 17, wherein the second control circuit further includes a comparator that compares a signal at a node between the second winding of the transformer and the output switch with a reference voltage signal to output a comparison signal to the timer circuit, the comparison signal being used by the timer circuit to adjust a delay of the timer circuit.

20. The SMPS of claim 19, wherein the timer circuit is configured to detect the width of the comparison signal to determine the delay of the timer circuit.

* * * * *